Sept. 4, 1928.
W. H. COTTON
DRAFT GEAR
Filed Aug. 29, 1923
1,683,164
2 Sheets-Sheet 1
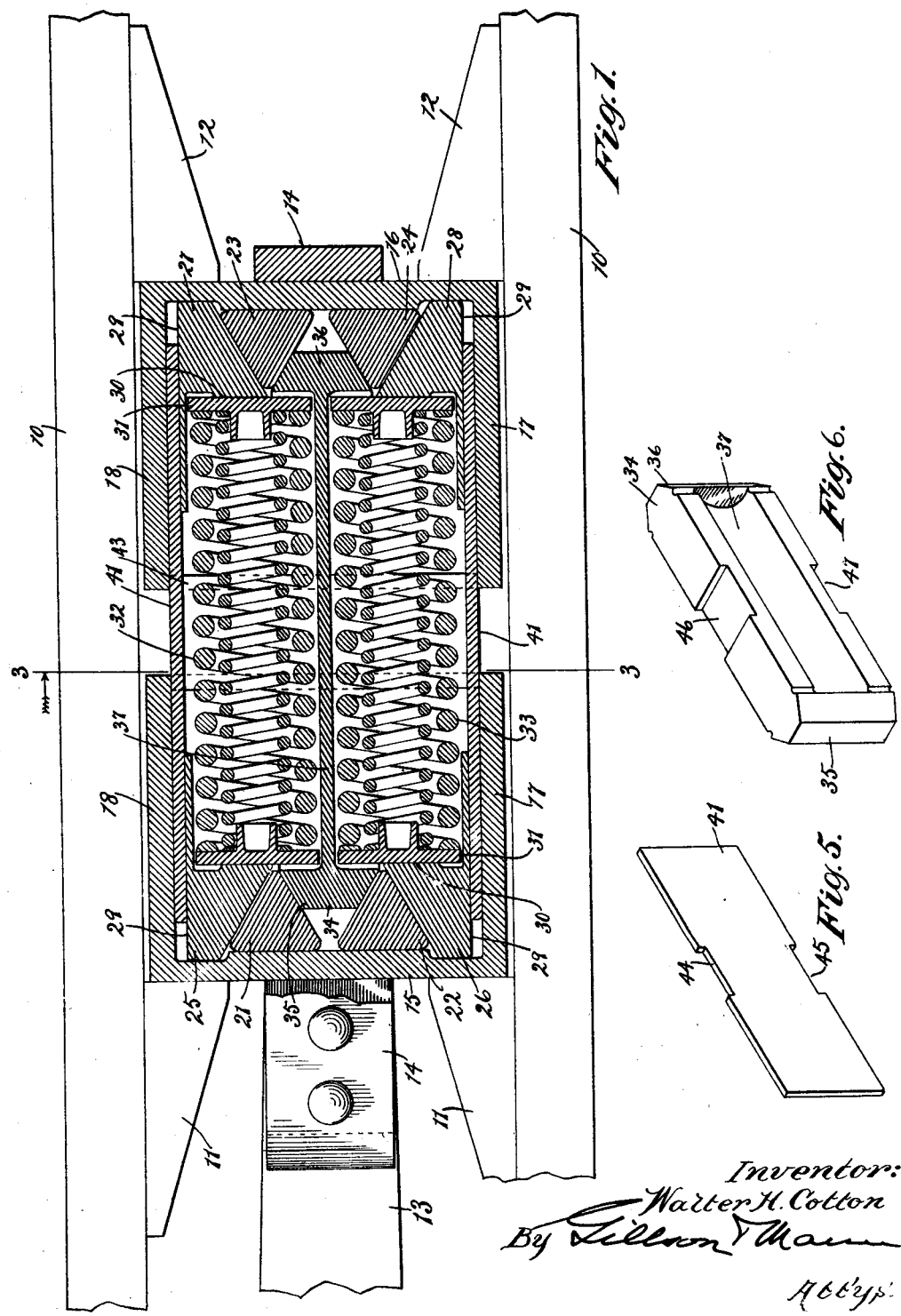
Inventor:
Walter H. Cotton
By
Att'ys Sept. 4, 1928.
W. H. COTTON
DRAFT GEAR
Filed Aug. 29, 1923
1,683,164
2 Sheets-Sheet 2
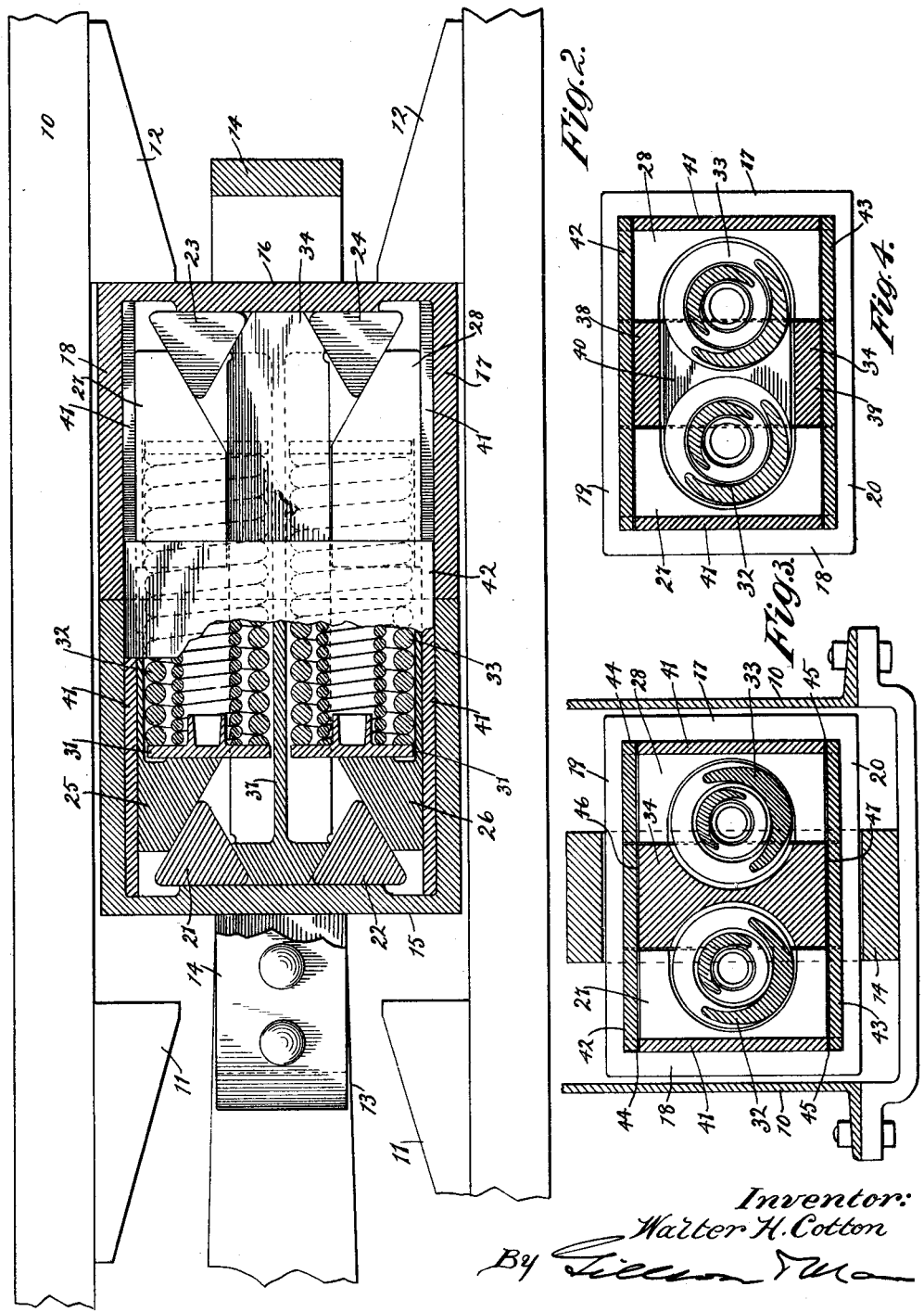
Inventor:
Walter H. Cotton
By
Attys.

Patented Sept. 4, 1928.

1,683,164

UNITED STATES PATENT OFFICE.

WALTER H. COTTON, OF CHICAGO, ILLINOIS, ASSIGNOR TO UNION DRAFT GEAR COMPANY, OF CHICAGO, ILLINOIS, A CORPORATION OF DELAWARE.

DRAFT GEAR.

Application filed August 29, 1923. Serial No. 659,865.

The invention relates to draft gears for railway cars, and is of the type in which reliance is had in great measure upon friction for absorbing the stresses incident to draft and buffing.

Its objects are to secure a high degree of efficiency, smoothness of action, certainty of release, economy of manufacture and durability.

The invention consists in a structure such as is hereinafter described, and as illustrated in the accompanying drawings, in which Fig. 1 is a detail plan view of the underframing of a car and a central plan section of the improved gear;

Fig. 2 is a view similar to Fig. 1, showing the gear under compression and some of its movable parts in plan and partly broken away;

Fig. 3 is a sectional view on the line 3—3 of Fig. 1;

Fig. 4 is a similar view of the gear detached from the car, showing a slightly modified form of construction; and Figs. 5 and 6 are details in perspective of certain of the elements of the gear.

There is represented at 10, 10, a pair of center or draft sills of a railway car, to each of which is attached a draft lug 11, 11, and a buffing lug 12, 12. At 13 there is shown the butt of a coupler of ordinary construction, and at 14 the coupler extension, shown in the form of a yoke or loop which encircles the gear. These parts are of any preferred construction.

The gear comprises a pair of followers 15, 16, for cooperating, respectively, with the draft and buffing shoulders. Each of these followers is in box form, having side walls 17, 18, and top and bottom walls 19, 20, all of which walls extend from the end plate, which takes bearing upon the lugs, and are of such length that the ends of these walls of the two followers abut when the desired limit of the compression of the gear is reached, for the purpose of preventing injury to the springs which are enclosed therein.

Seated against the inner face of the end wall of each of the followers is a pair of wedge-blocks 21, 22, and 23, 24, these blocks being preferably in the form of equilateral triangles. The outer faces of these several blocks are, of course, inclined inwardly with respect to the axis of the gear, and bear upon correspondingly inclined faces of wedging friction shoes 25, 26, 27 and 28 which are alike in form. The outer or lateral face 29 of each is parallel to the axis of the gear, and each has an instanding shoulder, as at 30, forming a seat for a spring, though preferably a plate 31 is inserted and constitutes the spring seat. The inner lateral face of each of the shoes 25 to 28, beyond the shoulder 30, is recessed in concave form to accommodate the spring and the spring seats named, when the latter are present.

Helical springs 32, 33, are interposed between each pair of shoes and each may, as shown, comprise a pair of nested or concentrically assembled springs.

Located upon the axis of the gear is an element 34, the length of which is approximately, but not to exceed, the distance between the inner faces of the end walls of the followers when the gear is completely compressed. The ends of the element 34 are formed into heads 35, 36, having laterally inclined wedging faces for engaging the inner faces of the wedge-blocks 21, 22, and 23, 24. In the form of construction shown in Fig. 3, the element 34 is provided throughout its length with a web portion 37, which is laterally concave to accommodate the springs and the several plates 31. In the construction shown in Fig. 4, this web is omitted, the heads 35, 36, being united by top and bottom tie members 38, 39, and there being employed two plates, as 40 (only one of which is shown), each forming a seat for both of the springs 32, 33.

Interposed between the shoes 25, 27, and the shoes 26, 28, and the adjacent side walls of the followers 15, 16, is a friction plate 41, 41, the length of which is preferably approximately, and necessarily, not to exceed the distance between the end walls of the two followers when the gear is fully compressed. The plates 41, 41, are normally centrally disposed between the ends of the gear, and they may be interlocked with the element 34 by means of top and bottom plates 42, 43, fitting within recesses 44, 45, in the top and bottom margins of the plates 41, and recesses 46, 47, in the element 34. The upper and lower faces of the element 34 being of substantial width, the plates 42, 43, may fit snugly within the recesses therein for the purpose of maintaining them substantially perpendicular to the axis of the gear and insuring uniformity of movement of the friction plates with the element 34, both in the compressive and release movements of the gear.

Under the influence of buffing stresses the follower 15 is moved backwardly, carrying with it the wedge-blocks 21, 22. The element 34 is forced inwardly and causes the spreading or lateral separation of the triangular wedge-blocks at each end of the gear, this movement resulting in the advance, toward the center of the gear, of all of the shoes 25 to 28, and the consequent compression of the springs 32, 33. The pressure of the triangular wedge-blocks against the shoes urges them laterally, pressing the plates 41, 41, against the side walls of the followers. As these friction plates travel with the element 34 they necessarily slide upon the side walls of the followers, and there is also sliding movement upon these plates of the shoes 25 to 28. In addition to the friction developed between these elements there is also friction developed between the several wedging faces and between the outer faces of the triangular wedge-blocks and the end walls of the followers.

Upon the relief of buffing stresses the various parts of the gear return to their normal positions, as shown in Fig. 1, under the influence of the springs 32, 33, the release action, however, being sufficiently delayed by friction to prevent shock.

The action of the gear under the influence of draft stresses is the same as in buffing, but in the opposite direction longitudinally.

Various changes in the embodiment of the invention may be made without departing from its scope. For example, the plates 41 may be omitted, permitting the shoes to directly engage the side walls of the followers.

The interlocking of the friction plates 41, 41 with each other and with the central member 34 by means of plates or bars as 42, or otherwise, may be omitted as the friction of the several parts will insure substantial positioning of the friction plates midway of the ends of the gear when in release position.

I claim as my invention:

1. In a draft gear, in combination, a pair of chambered followers, a pair of triangular wedge blocks seated against the end walls of each follower, a central element having wedge-shaped ends bearing upon the inner faces of all the said wedge blocks, a friction shoe having a wedging face engageable with the outer face of each wedge block, such shoe having an instanding and inwardly facing shoulder, springs reacting between the shoes at each side of the gear, a friction plate interposed between the shoes at each side of the gear and the adjacent side walls of the followers, and means movable with said central member for positioning said plates.

2. In a draft gear, in combination, a pair of chambered followers, a pair of triangular wedge blocks seated against the end walls of each follower, a central element having wedge-shaped ends bearing upon the inner faces of all the said wedge blocks, a friction shoe having a wedging face engageable with the outer face of each wedge block, such shoe having an instanding and inwardly facing shoulder, springs reacting between the shoes at each side of the gear, a friction plate interposed between the shoes at each side of the gear and the adjacent side walls of the followers, and means for interlocking the friction plates with the central element.

3. In a draft gear, in combination, a pair of chambered followers, a pair of triangular wedge blocks seated against the end walls of each follower, a central element having wedge-shaped ends bearing upon the inner faces of all the said wedge blocks, a friction shoe having a wedging face engageable with the outer face of each wedge block, such shoe having an instanding and inwardly facing shoulder, springs reacting between the shoes at each side of the gear, a friction plate interposed between the shoes at each side of the gear and the adjacent side walls of the followers, and a cross plate seated in recesses in the friction plates and the central member.

4. In a draft gear, in combination, two pairs of triangular wedge blocks, a unitary element having wedge-shaped ends bearing upon the inner faces of all the said wedge blocks, a plurality of friction shoes, each shoe having a wedging face engageable with the outer face of each wedge block and adapted to move laterally upon compression of the gear, such shoe having an instanding and inwardly facing shoulder, springs reacting between the shoes at each side of the said gear, and means for holding the parts of the mechanism in assembled relation.

5. In a draft gear, in combination, followers having side walls, a friction plate slidably engaging one of the side walls of each follower, a friction shoe at each end of the plate for slidably engaging the plate, wedge means for advancing the shoes and for pressing them against the plate, the range of longitudinal movement of the shoes being relatively greater than that of the plate, means for yieldingly opposing the advance of the shoes, and means for resisting lateral pressure of said shoes and cooperating wedge means.

6. In a draft gear, in combination, a pair of opposed chambered followers, a pair of friction plates engageable with the side walls of both followers and of less length than the normal distance between the end walls of such followers, a friction shoe engaging each end portion of each plate, each shoe having an inwardly inclined face, a laterally movable wedge block engageable with the inclined face of each shoe, means for moving the wedge blocks laterally outward, and spring means resisting the advance of the shoes.

7. In a draft gear, in combination, a pair of opposed chambered followers, a pair of friction plates engageable with the side walls of both followers and of less length than the normal distance between the end walls of such followers, a friction shoe engaging each end portion of each plate, each shoe having an inwardly inclined face, a laterally movable wedge block engageable with the inclined face of each shoe, a double ended wedge member for moving the blocks laterally outward, and spring means resisting the advance of the shoes.

WALTER H. COTTON.